June 23, 1942.  W. B. JOHNSON  2,287,040
TRACTION DEVICE
Filed Nov. 13, 1941
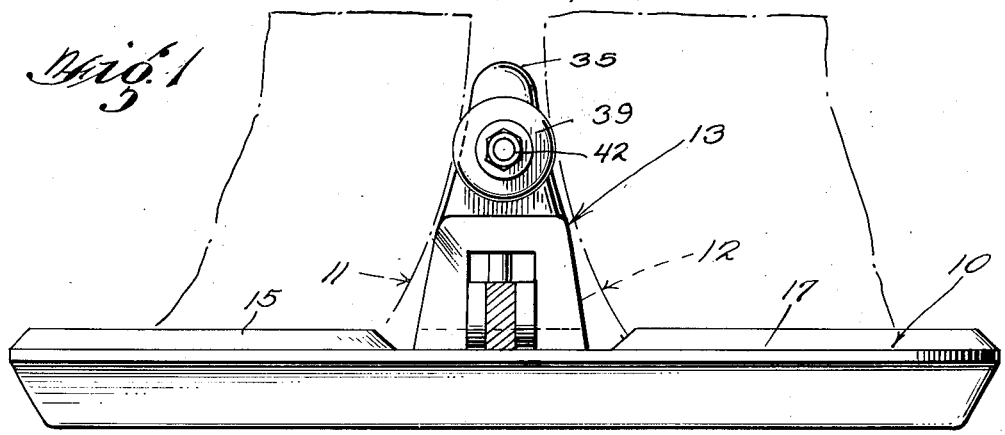
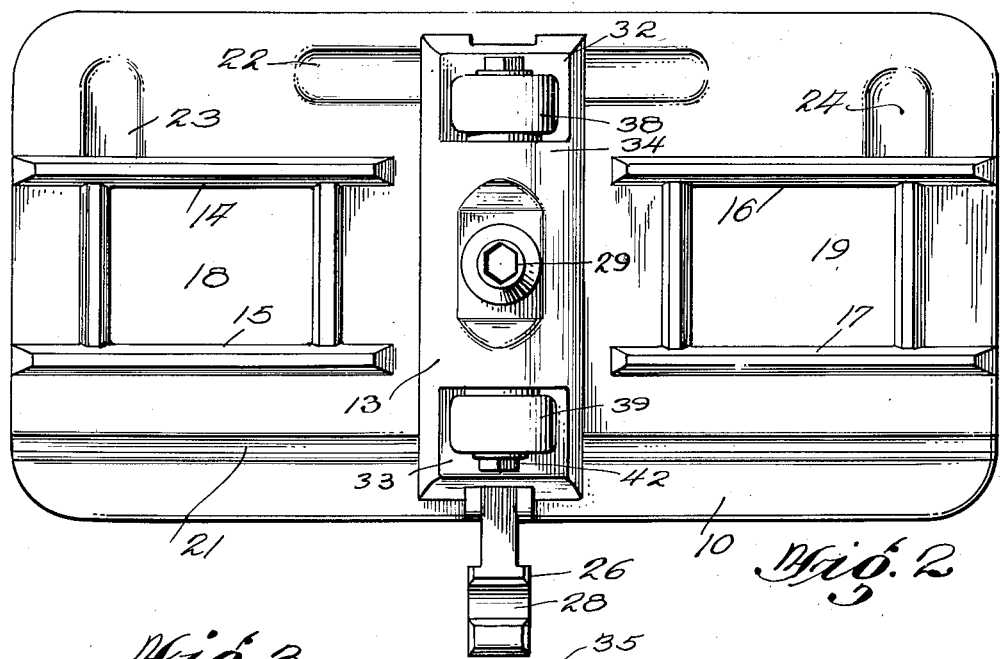
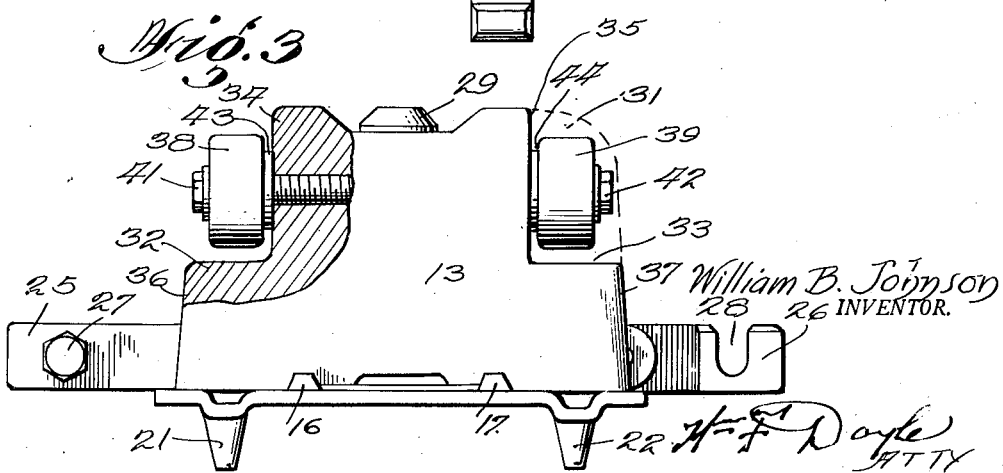
William B. Johnson
INVENTOR.

Patented June 23, 1942

2,287,040

UNITED STATES PATENT OFFICE 2,287,040

TRACTION DEVICE

William B. Johnson, United States Army

Application November 13, 1941, Serial No. 418,885

3 Claims. (Cl. 152—220)

(Granted under the act of March 3, 1883, as amended April 30, 1928; 370 O. G. 757)

The invention described herein, if patented, may be manufactured and used by or for the Government for governmental purposes without the payment of any royalty thereon.

The present invention relates to traction devices of the type having a series of grouser plates interconnected by links, and arranged to be applied to conventional types of pneumatic-tired automobile wheels. More specifically, the invention relates to a particular type of guide mechanism associated with a grouser plate traction device of the class in which each individual grouser plate extends across the traction surfaces of a pair of dual tires and each grouser includes a guide element arranged to be received between the side walls of the adjacent tires to prevent shifting of the plate and tires with respect to each other.

It is recognized by the inventor that it has been customary in the prior art to provide grouser plates extending across the traction surfaces of a pair of dual tires and having guide members arranged to occupy the space between the tires, but in the forms of devices known in the prior art the guides had been unsatisfactory, in that when the grouser plates are put under uneven strains (as in passing over rough or irregular ground) the tendency of the plates to shift from a true transverse position parallel to the wheel axis to some angular position has been such as to cause the end portions or corners of the grouser guides to dig into the side walls of the tires and bruise or chafe the fabric to such a large extent that the tire may be seriously damaged. It has been suggested in the prior art that desirable results might be accomplished by shortening the length of the guide portions in the hope of reducing the tendency of the guide ends to damage the tire side walls, but in practice this theory has proven unsatisfactory since it is found to permit an unusually large degree of variation from true transverse position of the grousers which has in turn caused serious damage to connecting links and has caused uneven operation of the vehicle.

It is, therefore, the prime object of the present invention to provide an improved guide member for pneumatic tire traction devices, the guide member being so designed and constructed as to maintain the grousers in transverse position without damaging the side walls of the tire casings.

A further object of the invention is to provide antifriction rollers between the ends of the grouser guide structure and the tire side walls to reduce friction incident to the relative movement of the guide with respect to the tires.

A further object of the invention is to provide a tire guide portion adapted to be received between the side walls of a pair of dual tires with notches at the forward and rear corners of the guide to receive rollers whereby the friction between the ends of the guide and the tire side walls will be materially reduced.

A further object of the invention is to provide tapered guide portions and friction-reducing rollers of a diameter slightly larger than the thickness of the guide at the axis of the roller whereby the tires will be engaged by the roller before coming into engagement with the tapered portion of the guide.

Referring now more particularly to the drawing accompanying and forming a part of this specification:

Fig. 1 is a front elevational view of a traction device constructed in accordance with the teachings of the present disclosure.

Fig. 2 is a plan view of the traction device illustrated in Fig. 1.

Fig. 3 is an end elevational view of one of the traction devices and its interconnecting links.

The traction device here disclosed comprises, in general, a grouser 10 adapted to extend across the traction surfaces of a pair of dual tires indicated in the drawing by the dotted line outlines 11 and 12.

From an examination of the disclosure of Fig. 2 it will be apparent that the grouser 10 is of a transverse length greatly in excess of its width and that the guide portion 13, which is positioned centrally of the length of the grouser, is of such length as to extend substantially the full width of the grouser plate. The grouser plate 10 is preferably provided with tire-engaging lugs and a plurality of cleats on its lower face to improve the traction of the vehicle in snow, gravel or mud. In the form of grouser plate illustrated in the drawing, the tire-engaging lugs 14, 15, 16 and 17 are positioned forwardly and rearwardly of the openings 18 and 19 in the plate. The lower surface of the grouser plate 10 is preferably provided with a longitudinal cleat 21 extending the full length of the grouser and a shorter longitudinal cleat 22 positioned centrally of the grouser adjacent its opposite edge. If desired, these plates may each be provided with a pair of relatively short cleats 23 and 24 which extend transversely of the plate so as to resist transverse shifting of the vehicle when the traction devices are in use.

The guide portions generally indicated at 13 are welded or otherwise permanently secured to the upper faces of the grouser plates and are tapered inwardly along their sides to assume a contour generally following the shape of the space between the tires of the vehicle wheel. At the forward and rear ends of the guide portion 13 conventional connecting links 25 and 26 are provided so that each plate may be connected with the next adjacent plate by inserting the link 26 in the bifurcated end of the link 25 and tightening the cap screw 27. It will be noted from Fig. 3 that the link 26 is provided with a notch 28 to accommodate the cap screw 27. The guide structure and connecting links are also arranged to include an adjusting mechanism housed within the body of the guide 13 so that the position of the links may be adjusted by manual rotation of the adjusting screw 29. Those structures are considered conventional, however, and inasmuch as they do not form a pertinent part of the present invention, will not be described further in this application.

In the conventional form of traction device it has been customary to provide guide portions of a length and height approximating the dimensions shown in the drawings of the present application, but it has been common practice to shape the upper corners of the guide into a somewhat rounded curve such as indicated by the dotted line 31 in Fig. 3. The structure disclosed in the present invention differs sharply from the prior art in this respect in that the ends of the guide 13 are shaped to provide inwardly extending right angle notches 32 and 33, having vertical side walls 34 and 35 spaced longitudinally away from the end portions 36 and 37 of the guide 13. A pair of rollers 38 and 39 are mounted on the screw threaded studs 41 and 42, respectively, and each of the rollers is provided with a spacing washer such as the washers 43 and 44 to maintain adequate spacing between the inner edge of the roller and the outer edge of the face portion 34 or 35, respectively.

When in use, the traction devices disclosed in this application in the same manner as any of the traction devices of similar structure known to the prior art, that is, on the front wheels of a vehicle, the individual traction units are interconnected by the links 25 and 26 and drawn around the front wheels so that each of the grouser plates rests against the traction surface of the dual tires and the guide portions lie in the space between the adjacent tire side walls. The same arrangement may be used to apply traction devices on the rear vehicle wheels, if desired. As the tires roll forwardly on the track formed by the plurality of traction devices, any misalignment of the traction devices with respect to the true transverse position which they should theoretically assume will cause the guide portions of conventional traction devices to show a pronounced tendency to chafe the inner side walls of the tire casings or even to gouge the rubber from the fabric surface and do serious injury to the fabric structure of the tire. This tendency is overcome in the present device by the provision of the rollers 38 and 39, which will contact the side walls of the tire with a comparatively small amount of friction and before the full weight of the vehicle is applied to the traction plate the rollers will tend to shift the grouser into true transverse alignment and prevent the possibility of gouging or damaging the tires due to the condition of misalignment hereinbefore described. In this connection, it should be noted from an examination of Fig. 1 that the rollers 38 and 39 are of somewhat larger diameter than the transverse thickness of the guide portion at the axis of the roller. Thus, the roller will contact the tire surface somewhat before the tire contacts the surface of the guide and before the entire weight of the vehicle rests on the plate so that the grouser plates will have ample opportunity to be guided into its true transverse position before assuming the full weight of the vehicle. It will be noted, of course, that as the rollers 38 and 39 extend through both sides of the guide they will not tend to rotate when contacted by both of the vehicle tires in the same manner as when contacted by only one and when the traction plate has assumed its true position the side walls of the tire will bear against both sides of each of the rollers 38 and 39 and also against the side walls of the guide 13. The particular function of the rollers occurs before this point is reached, however, since as long as the individual traction devices have no tendency toward misalignment, no great difficulties are encountered with the guide structures. It is only when the individual grousers tend to assume misaligned diagonal positions that the function of the rollers becomes the most evident. In such cases, it will be obvious that the roller 38, for example, will contact one of the side walls of one of the tires, while the roller 39 will contact the opposite side wall of the opposite tire and thus the two will cooperate to bring the traction device into true alignment before the full weight of the vehicle comes to rest on the grouser plate.

Having thus described my invention, what is claimed as new and desired to secure by Letters Patent, is:

1. In a traction device, a grouser plate of generally rectangular configuration and of a length greatly in excess of its width whereby it may extend transversely across the tread surface of a pair of tires of a dual tire wheel, the said grouser plate being provided with the tire-engaging lugs on its upper surface, a plurality of ground-engaging cleats on its lower surface adapted to increase the tractional effect of the vehicle with respect to the ground, and a grouser guide portion, the guide portion being positioned centrally with respect to the length of the grouser plate and extending transversely across the width of the plate, its longitudinal dimension being approximately equivalent to the width of said plate and having tapered side walls, said guide portion being provided with a pair of notches at its upper forward corner and upper rearward corner, respectively, each of said notches including a stud and a friction-reducing roller rotatably mounted on said stud, said rollers being positioned in the upper half of the vertical dimension of the grouser guide entirely within the vertical and longitudinal dimensions of the guide and of a diameter to project outwardly on both sides of the guide portion whereby the side wall surfaces of the tires will tend to contact the outer surfaces of the rollers before engaging the tapered side surfaces of the traction device guide.

2. In a traction device, a grouser plate of generally rectangular configuration and of a length greatly in excess of its width whereby it may extend transversely across the tread surface of a pair of tires of a dual tire wheel, the said grouser plate being provided with tire-engaging lugs on its upper surface, a plurality of ground-engaging cleats on its lower surface adapted to increase the tractional effect of the vehicle with respect to the ground, and a grouser guide portion, the guide portion being positioned centrally with respect to the length of the grouser plate and extending transversely across the width of the plate, its longitudinal dimension being approximately equivalent to the width of said plate and having tapered side walls, said guide portion being provided with a pair of notches at its upper forward corner and upper rearward corner, respectively, each of said notches including a friction-reducing roller, said roller being of a diameter to project outwardly on both sides of the guide portion whereby the side wall surfaces of the tires will tend to contact the outer surfaces of the roller before engaging the tapered side surfaces of the traction device guide.

3. In a traction device, a grouser plate of generally rectangular configuration and of a length greatly in excess of its width whereby it may extend transversely across the tread surface of a pair of tires of a dual tire wheel, the said grouser plate being provided with the tire-engaging lugs on its upper surface, a plurality of ground-engaging cleats on its lower surface adapted to increase the tractional effect of the vehicle with respect to the ground, and a grouser guide portion, the guide portion being positioned centrally with respect to the length of the grouser plate and extending transversely across the width of the plate, its longitudinal dimension being approximately equivalent to the width of said plate, said guide portion being provided with a pair of friction-reducing rollers at its upper forward corner and upper rearward corner, respectively, and each of said rollers being of a diameter to project outwardly on both sides of the guide portion whereby the side wall surfaces of the tires will tend to contact the outer surfaces of the rollers before engaging the tapered side surfaces of the traction device guide.

WILLIAM B. JOHNSON.